United States Patent [19]

Vali

[11] Patent Number: 5,224,188

[45] Date of Patent: Jun. 29, 1993

[54] ECCENTRIC CORE OPTICAL FIBER

[75] Inventor: Victor Vali, Laguna Hills, Calif.

[73] Assignee: Hughes Aircraft Company, Los Angeles, Calif.

[21] Appl. No.: 977,738

[22] Filed: Nov. 12, 1992

Related U.S. Application Data

[63] Continuation of Ser. No. 723,714, Jun. 18, 1991, abandoned, which is a continuation of Ser. No. 511,619, Apr. 20, 1990, abandoned.

[51] Int. Cl.⁵ .......................... G02B 6/00; G02B 6/36
[52] U.S. Cl. .............................. 385/96; 385/124
[58] Field of Search .............. 350/96.15, 96.16, 96.29, 350/96.30, 96.32, 96.33, 96.34; 385/12, 13, 30, 123, 124, 126, 127, 128, 96

[56] References Cited

U.S. PATENT DOCUMENTS

| | | | |
|---|---|---|---|
| 3,950,073 | 4/1976 | Horiguchi et al. | 350/96.33 |
| 4,049,413 | 9/1977 | French | 385/126 X |
| 4,057,322 | 11/1977 | Kao | 350/96.29 |
| 4,133,664 | 1/1979 | Aulich et al. | 65/3 |
| 4,264,347 | 4/1981 | Shintani et al. | 65/3 |
| 4,315,666 | 2/1982 | Hicks, Jr. | 350/96.15 |
| 4,342,499 | 8/1982 | Hicks, Jr. | 350/96.15 |
| 4,357,389 | 11/1982 | Satoh et al. | 428/373 |
| 4,426,129 | 1/1984 | Matsumura et al. | 350/96.33 |
| 4,506,947 | 3/1985 | Tatekura et al. | 350/96.21 |
| 4,594,763 | 6/1986 | Frazee, Jr. et al. | 29/407 |
| 4,607,912 | 8/1986 | Burns et al. | 385/123 X |
| 4,630,890 | 12/1986 | Ashkin et al. | 385/124 |
| 4,681,399 | 7/1987 | Hicks, Jr. | 385/123 |
| 4,763,980 | 8/1988 | Gerber et al. | 350/96.20 |
| 4,812,014 | 3/1989 | Sawano et al. | 350/96.29 |
| 4,820,322 | 4/1989 | Baumgart et al. | 65/3.11 |
| 4,825,092 | 4/1989 | Mehadji | 250/561 |
| 4,832,438 | 5/1989 | Engel et al. | 350/96.20 |
| 4,875,916 | 10/1989 | Baltzer et al. | 65/2 |
| 4,882,497 | 11/1989 | Inoue et al. | 250/560 |
| 4,886,333 | 12/1989 | Hicks | 350/96.15 |
| 4,893,894 | 1/1990 | Caimi | 350/96.29 |
| 4,925,269 | 5/1990 | Scrivener | 350/96.33 |
| 5,035,477 | 7/1991 | Schlump | 385/123 X |

OTHER PUBLICATIONS

"Distributed Fluid Sensor Using Eccentrically Cladding Fibers" by Yashikawa Electronics and Communications in Japan/Part II (Feb., 1988) pp. (89-96).
Patent Abstracts of Japan (May 1988) Publ #JP 62293132.
"Eccentric-Core Glass Optical Waveguide" by Miyashita Journal of Applied Physics (Feb., 1974) pp. (931-932).

Primary Examiner—Akm E. Ullah
Attorney, Agent, or Firm—Michael W. Sales; Terje Gudmestad; Wanda K. Denson-Low

[57] ABSTRACT

An eccentric core optical fiber 10 having a cross-sectional area sufficiently large to afford ease of manipulation, yet deposed to operate in an evanescent mode, is disclosed herein. The inventive optical fiber 10 includes a fiber core 20 of a first index of refraction. The fiber core 20 circumscribes a first longitudinal axis. The optical fiber 10 of the present invention further includes fiber cladding material 30 of a second index of refraction chosen to be less than the first index of refraction. The cladding material 30 circumscribes both a fiber core 20 and a second longitudinal axis oriented parallel to but not coincident with the first longitudinal axis.

1 Claim, 2 Drawing Sheets

ECCENTRIC CORE OPTICAL FIBER

This is a continuation of application Ser. No. 07/723,714, filed Jun. 18, 1991 now abandoned which is a continuation of application Ser. No. 07/511,619, filed Apr. 20, 1990 now abandoned.

BACKGROUND OF THE INVENTION

1. Field of the Invention

This invention relates to optical fibers. More specifically, this invention relates to optical fibers intended for use in a device which makes use of the evanescent wave.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

In conventional fiber optic sensors light guided within an optical fiber is modified in reaction to various external physical, chemical or similar influences. Light from a source is coupled into the fiber and subsequently propagates to a region in which a measurement is to take place. In extrinsic sensors the guided light then may exit the fiber and interact with the substance being measured (measurand) prior to being relaunched into the same or a different fiber. Alternatively, in intrinsic sensors the light remains within the fiber throughout the measurement region.

In another type of optical fiber sensor, generally known as an evanescent wave sensor, the light guided by the fiber is partially conducted via the evanescent (i.e. exponentially decaying) wave which surrounds the core. In evanescent wave sensors a cladding sheath surrounds the optical fiber core creating a cladding-core interface such that an evanescent wave is supported by the cladding. The evanescent wave comprises a portion of the optical energy injected into the fiber which propagates along the length of the fiber within the cladding. The measurand surrounding the fiber may either absorb or change the properties of the evanescent wave, thus enabling a measurement to be performed. Employment of evanescent wave coupling into the measurand may be preferred over extrinsic mode fiber sensors in applications requiring direct interaction between the light beam and the measurand since the former approach requires no relaunching of the beam.

Unfortunately, the extremely small cross-sectional areas of fibers used in evanescent measuring devices generally render the fibers fragile and difficult to manipulate. While conventional optical fibers may have a standard cross-sectional diameter on the order of 120 $\mu$m, evanescent wave fibers often have a cross-sectional diameter of less than 15 $\mu$m. This small diameter arises as a consequence of the requirement that the cladding layer surrounding the core be sufficiently small to permit measurable coupling into the measurand.

Accordingly, a need in the art exists for an optical fiber which can be used to take advantage of the evanescent wave yet still have sufficient cross-sectional area to afford ease of manipulation.

SUMMARY OF THE INVENTION

The need in the art for an optical fiber of sufficient cross-sectional area to allow ease of manipulation, yet disposed to operate using the evanescent mode, is addressed by the eccentric core fiber of the present invention. The optical fiber includes a fiber core of a first index of refraction. The fiber core circumscribes a first longitudinal axis. The optical fiber further includes a fiber cladding material of a second index of refraction chosen to be less than the first index of refraction. The cladding material circumscribes both the fiber core and a second longitudinal axis oriented parallel to the first longitudinal axis, but not coincident therewith.

DESCRIPTION OF THE INVENTION

Figure 1:
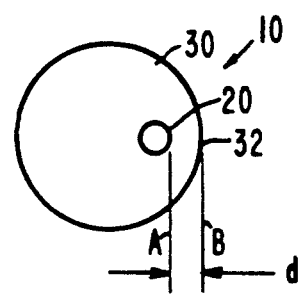
FIG. 1 is a cross-sectional view of a preferred embodiment of the eccentric core fiber of the present invention.

FIG. 1 is a cross-sectional view of a preferred embodiment of the eccentric core fiber 10 of the present invention. The fiber 10 includes a cylindrical fiber core 20 circumscribed by a cylindrical sheath of cladding material 30. The core 20 and the cladding 30 circumscribe parallel, non-coincident longitudinal axes (not shown). Accordingly, in the embodiment of FIG. 1 the minimum distance d between the exterior surface B of the cladding 30 and the interface A defined by the cladding 30 and core 20 remains constant throughout the fiber 10. However, in alternative embodiments of the fiber 10 it may be desired to vary the distance d along the length thereof. As is discussed more fully below, the distance d is adjusted such that a measurable portion of the evanescent wave supported by the fiber 10 extends through the distance d and penetrates the region of space external to the cladding 30 (e.g., a region occupied by a measurand). This feature of the fiber 10 allows a substance (measurand) immediately adjacent to the exterior surface B to interact with a portion of the fiber evanescent wave causing a loss of optical energy to the measurand and resulting in a measurable decrease in the intensity of optical energy flowing through the fiber core. In this manner the fiber 10 may be incorporated into an evanescent field sensor irrespective of the specific cross-sectional area of the cladding 30.

Evanescent Wave Operation

Figure 2:
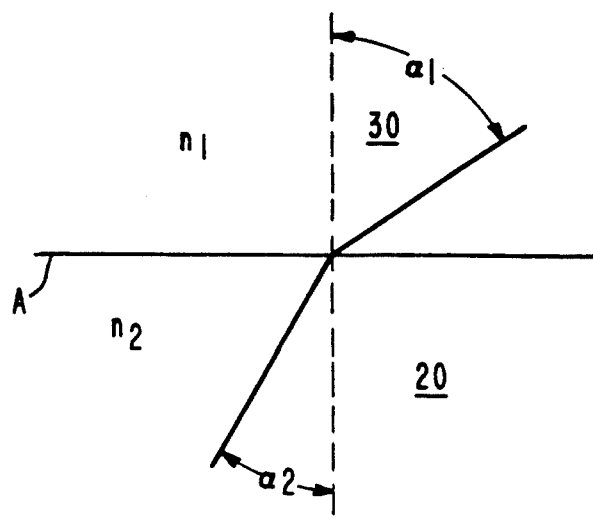
FIG. 2 is an illustrative representation of the propagation of a light ray across the interface A separating the core and cladding of the inventive eccentric core fiber.

As shown in FIG. 2, at the interface A of the cladding 30 and the core 20 having respective indices of refraction $n_1$ and $n_2$, a portion of the light incident at an angle $\alpha_2$ is refracted at an angle $\alpha_1$. By Snell's Law the angles $\alpha_1$, $\alpha_2$ and the indices of refraction satisfy the relationship:

$$\sin \alpha_2 / \sin \alpha_1 = n_1 / n_2 \qquad [1]$$

When an optical beam propagates from the core 20 to the cladding 30 with $n_2$ chosen to be larger than $n_1$, there is a maximum angle $\alpha_2$ for which $\alpha_1$ becomes equal to 90 degrees. This is known as the angle of total internal reflection. Under this circumstance the entire beam is reflected back into the core 20. Nonetheless, in a thin layer of the cladding 30 immediately adjacent to the interface A there exists an exponentially decreasing intensity of light propagating parallel thereto. As is well known, the optical energy propagating within this thin layer in the cladding 30 is termed the evanescent wave.

The evanescent wave is always present at such an interface. The evanescent wave represents energy traveling parallel to the longitudinal axis of the core 20 and does not represent any loss of optical energy from the core. However, if a medium contacts the exterior of the cladding and has an index of refraction $n_3 > n_1$ (the index of refraction of the cladding) and if the cladding is sufficiently thin, then a measurable amount of energy will be coupled into the medium and result in a measurable loss of energy from the core 20.

Figure 3:
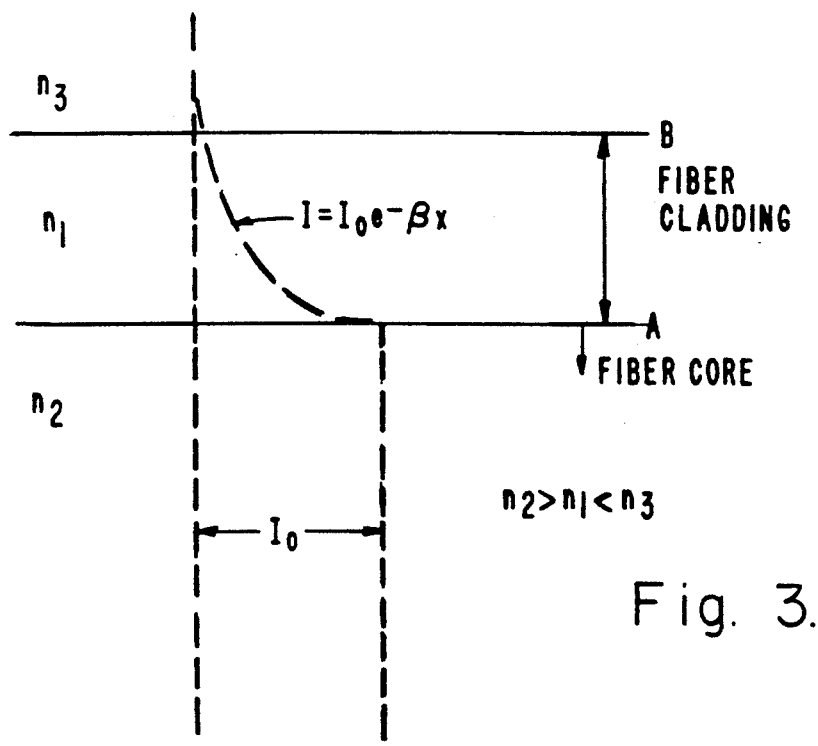
FIG. 3 is a diagrammatic representation of the light intensity distribution within the portions of the core and the cladding surrounding the interface A.

FIG. 3 is a diagrammatic representation of the light intensity distribution within the portions of the core 20 and the cladding 30 surrounding the interface A. The intensity of the evanescent wave within the cladding 30 of refractive index $n_1$ is given (as a function of the distance x from the interface A) by:

$$I = I_o e^{-\beta x} \quad [2]$$

where the attenuation coefficient $\beta$ is (for a small glancing angle of $90 - \alpha_2$ degrees):

$$\begin{aligned}\beta &= 2\pi (n_2^2 - n_1^2)^{\frac{1}{2}}/\lambda \\ &= (2\pi/\lambda)(2n\Delta n)^{\frac{1}{2}}\end{aligned} \quad [3]$$

Here $\lambda$ is the wavelength of light and $\Delta n = n_2 - n_1$ ($n \approx n_1 \approx n_2$). Assuming an evanescent wave intensity of unity at the interface A, the reciprocal of $\beta$, is generally known as the penetration depth and is equivalent to the distance from the interface A at which the value of the evanescent wave falls to 1/e.

Eccentric Fiber Design

On the basis of equations [2] and [3] the intensity of the exponential wave within the cladding 30 relative to the interface between the core 20 and cladding 30 may be determined. Specifically, the value of the evanescent wave at a point 32 on the surface of the cladding 30 separated from the core 20 by the minimum cladding thickness d (see FIG. 1) can be calculated. In order that part of the evanescent wave be enabled to exist external to the fiber 10 such that interaction with a measurand may occur, the distance d will generally be chosen to be between approximately 2 and 20 µm. The distance d chosen for a particular fiber will depend on the difference in the indices of refraction of the core 20 and cladding 30. In any event, the distance d must be sufficiently small to permit measurable coupling of the evanescent wave into the measurand.

The fiber 10 may be tailored for single or multi-mode operation. In single mode operation, the diameter of the core 20, and the relative refraction indices of the core 20 and cladding 30, are selected such that only a dominant mode propagates within the fiber 10. Those skilled in the art may recognize other techniques for adapting a particular fiber design for multi-mode operation. For example, multi-mode operation may be effected in certain instances by enlarging the diameter of the core 20 and increasing the difference in the respective indices of refraction of the core 20 and cladding 30.

In the embodiment of FIG. 1 the cladding 30 may be chosen to have a diameter of approximately 120 µm. to afford ease of manipulation. As was noted in the Background of the Invention, such small diameter fibers are generally unwieldy. The cladding may be realized from a variety of materials including silicon dioxide ($SiO_2$), which has an index of refraction of 1.45. The core 20 may be fabricated from silicon dioxide mixed with germanium oxide ($GeO_2$) in order to yield an index of refraction of 1.46.

If the fiber 10 is immersed in a medium such as air having a refractive index $n_3$ such that $n_2 > n_1 > n_3$, then substantially no losses due to absorption or leakage of the evanescent wave occur. In contrast, upon immersion of the fiber 10 in a measurand of refractive index $n_3'$ where $n_2 > n_1 < n_3'$, the "tail" of the evanescent wave propagating external to the cladding 30 is either absorbed or redirected by the measurand such that optical loss occurs. The rate of light loss from the fiber 10 may be adjusted by varying the minimum cladding thickness d (see FIG. 1). In this manner the inventive fiber 10 may be adapted for utilization in a variety of measurement and detection devices.

Typical of such devices using the evanescent wave are certain sensors such as disclosed in a copending application entitled Fiber Optic Fuel and Liquid Gauge, by V. Vali et al., filed Feb. 23, 1990, Ser. No. 484,295 and Fiber Optic Leak Detector by V. Vali et al., filed Apr. 20, 1990, Ser. No. 07/511,618.

Figure 4:
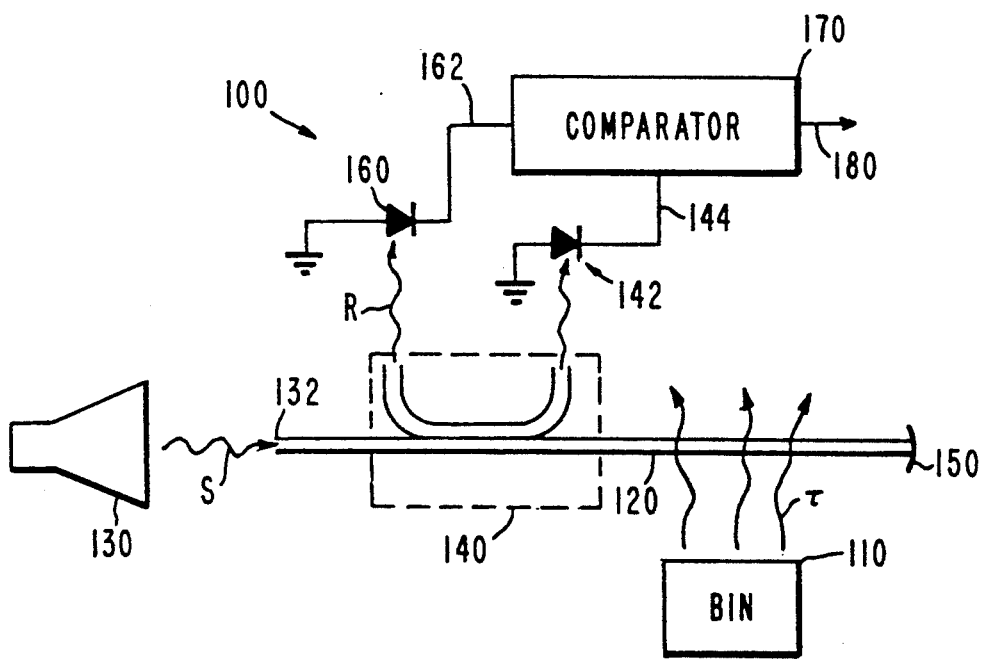
FIG. 4 is a schematic representation of a detection system disposed to sense the presence of a gaseous measurand $\tau$.

FIG. 4 is a schematic representation of one such detection system 100 disposed to sense the presence of a gaseous measurand $\tau$. In the embodiment of FIG. 4 the system 100 is situated in a closed room or laboratory which includes a storage bin 110. The bin 110 initially encloses the measurand $\tau$ which may, for example, constitute fumes from a toxic substance included therein. As is described below, the system 100 is adapted to detect concentrations of the measurand $\tau$ surrounding the inventive fiber 120 in excess of a predetermined level due to a leak or puncture of the container 110.

The system 100 includes the eccentric core fiber 120 of the present invention. The system 100 includes a laser source 130 for generating an optical beam S which is conventionally launched onto a first end 132 of the inventive fiber 120. A reflector 150 is provided at a second end of the fiber. A fiber optic beamsplitter 140 routes a portion of the light energy injected into the first end 132 to a first photodetector 142. A portion of the light reflected by the reflector 150 is also coupled by the beamsplitter 140 to a second photodetector 160. The first photodetector 142 transmits an electrical signal on a signal line 144 to a comparator 170 indicative of the intensity of the light energy initially coupled to the inventive fiber 120. The second photodetector 160 transmits an electrical signal on line 162 to the comparator 170 indicative of the intensity of the light reflected through the inventive fiber 120. The comparator circuit 170 compares the values of the electrical signals on the lines 144, 162 and thereby determines the optical loss occurring as a result of propagation through the fiber 120.

In the absence of a measurand immediately adjacent to the fiber 120 this optical loss is substantially zero. However, in the event of emission of the gaseous measurand $\tau$ from the container 110 the concentration thereof in the volume of space immediately adjacent to the fiber 120 will increase. The wavelength of optical energy from the source 130 is chosen such that the evanescent wave is absorbed by the gaseous measurand τ. Accordingly, release of the measurand τ results in a decrease in the intensity of the beam R and a concomitant decrease in the signal level present on the line 162. In an illustrative application, in response to a sufficient drop in the magnitude of the signal carried by the line 162 relative to the signal on the line 144 the comparator 170 impresses a warning signal on an output line 180. The warning signal may thus be used to warn of the existence of the gaseous measurand τ in the vicinity of the fiber 120.

Fiber beamsplitters suitable for use as the beamsplitter 140 are commercially available; for example, the model F560B beamsplitter marketed by Newport Research Corporation, 18325 Mt. Baldy Circle, Fountain Valley, Calif. 92728-8020, is suitable for the purpose.

Photodetectors suitable for use as photodetectors 142 and 160 are commercially available; for example, the model C30808 photodetector device marketed by RCA, 773 Donegal Business Center, P.O. Box 540, Mt. Joy, Pa. 17552, is suitable for the purpose.

The laser light source 130 may comprise a semiconductor laser such as the model LB1-02 laser marketed by Stantel Components, Inc., 636 Remington Road, Schaumberg, Ill. 60173. Alternatively, other light sources may be used, such as an incandescent light bulb or light emitting diode (LED).

While the system 100 depicted in FIG. 4 involved a gaseous measurand the eccentric fiber of the present invention is equally well suited for utilization in measurement systems employed in liquid environments. For example, the inventive fiber could be utilized to monitor the purity of a solution. If the presence of a contaminant in the otherwise pure solution tended to lower the refractive index thereof, the index of refraction of the cladding would be chosen to be slightly less than that of the uncontaminated solution. Accordingly, when immersed in the pure solution the optical energy propagating through the inventive fiber would be subject to only minimal losses. The introduction of an impurity into the solution would then result in the refractive index of the solution becoming less than that of the fiber cladding, which would result in an elimination of the evanescent wave optical loss. The accompanying reduction increase in the intensity of the beam emerging from the inventive fiber would thus signal the presence of the contaminant in the solution.

Similarly, if the presence of a contaminant tended to raise the refractive index of the otherwise pure solution the index of refraction of the fiber cladding would be chosen to be slightly higher than that of the uncontaminated solution. Upon introduction of a sufficient concentration of the contaminant in the solution the refractive index thereof would become larger than that of the fiber cladding thereby inducing evanescent wave loss. The presence of the contaminant would thus be signaled by a decrease in the intensity of the beam emitted by the inventive fiber.

Thus the present invention has been described with reference to a particular embodiment in connection with a particular application. Those having ordinary skill in the art and access to the teachings of the present invention will recognize additional modifications and applications within the scope thereof. For example, the eccentric core fiber of the present invention is not limited to cylindrical fiber cores. Fiber cores of non-circular cross-section may be utilized without departing from the scope of the present invention. Similarly, it is not necessary that the fiber cladding be of circular cross-section. Other cladding shapes enabling the existence of an evanescent wave on at least a portion of the external surface thereof may be suitable for inclusion in the inventive fiber. Further, the applications of the inventive fiber are not limited to the detection apparatus described herein. Those skilled in the art may be aware of other measurement schemes in which the fiber of the present invention could be employed. It is therefore contemplated by the appended claims to cover any and all such modifications, applications and embodiments.

Accordingly, what is claimed is:

1. An eccentric core optical fiber for sensing the presence of a measurand located external to the fiber and having a known index of refraction $n_3$, said fiber consisting of:

a single fiber core having a first index of refraction $n_2$ and circumscribing a first longitudinal axis; and a fiber cladding material having a second index of refraction $n_1$ less than said first index of refraction, said cladding material circumscribing said fiber core and a second longitudinal axis parallel to but not coincident with said first longitudinal axis for providing a minimum distance d1 and a maximum distance d2 which separates said core from said measurand, said cladding material, second index of refraction, and d1 selected in combination with respect to the indices of refraction of the measurand and the core for providing a predetermined evanescent wave loss when said fiber is located in said measurand and illuminated with light energy at a known frequency and intensity and d2 selected to be substantially greater than d1 for enabling said sensing fiber to be manipulated without damage, said indices of refraction satisfying the condition that $n_2 > n_1 < n_3$ whereby the presence of said measurand can be accurately determined while the risk of damage to the sensing fiber is reduced.

* * * * *